United States Patent [19]
Margolin

[11] Patent Number: 5,904,724
[45] Date of Patent: May 18, 1999

[54] METHOD AND APPARATUS FOR REMOTELY PILOTING AN AIRCRAFT

[76] Inventor: Jed Margolin, 3570 Pleasant Echo, San Jose, Calif. 95148

[21] Appl. No.: 08/587,731

[22] Filed: Jan. 19, 1996

[51] Int. Cl.⁶ ............................. G06F 165/00; H04N 7/18
[52] U.S. Cl. ................................. 701/120; 701/2; 701/24; 244/189; 244/190; 348/114
[58] Field of Search ..................... 364/423.099, 424.012, 364/424.013, 424.021, 424.022, 449.2, 449.7, 460, 439, 424.028; 340/825.69, 825.72, 967, 989, 991, 992, 993; 244/189, 190, 181, 17.13, 3.11, 3.15; 348/42, 51, 113, 114, 117, 123, 143; 382/154; 395/118, 119, 125

[56] References Cited

U.S. PATENT DOCUMENTS

| | | | |
|---|---|---|---|
| 3,742,495 | 6/1973 | Diamantides | 342/64 |
| 3,795,909 | 3/1974 | Vehrs, Jr. | 343/7 |
| 4,218,702 | 8/1980 | Brocard et al. | 348/144 |
| 4,405,943 | 9/1983 | Kanaly | 358/133 |
| 4,467,429 | 8/1984 | Kendig | 343/433 |
| 4,660,157 | 4/1987 | Beckwith et al. | 345/421 |
| 4,739,327 | 4/1988 | Konig et al. | 342/26 |
| 4,760,396 | 7/1988 | Barney et al. | 342/65 |
| 4,835,532 | 5/1989 | Fant | 382/284 |
| 4,855,822 | 8/1989 | Naredra et al. | 364/423.099 |
| 4,964,598 | 10/1990 | Berejik et al. | 244/190 |
| 5,015,187 | 5/1991 | Lord | 364/462 |
| 5,072,396 | 12/1991 | Fitzpatrick et al. | 364/450 |
| 5,086,396 | 2/1992 | Waruszewski, Jr. | 364/454 |
| 5,155,683 | 10/1992 | Rahim | 364/424.029 |
| 5,179,638 | 1/1993 | Dawson et al. | 395/125 |
| 5,240,207 | 8/1993 | Eiband et al. | 364/423.099 |
| 5,257,347 | 10/1993 | Busbridge et al. | 395/129 |
| 5,266,799 | 11/1993 | Steinitz et al. | 324/330 |
| 5,272,639 | 12/1993 | McGuffin | 364/449 |
| 5,335,181 | 8/1994 | McGuffin | 364/443 |
| 5,381,338 | 1/1995 | Wysocki et al. | 348/116 |
| 5,406,286 | 4/1995 | Tran et al. | 342/13 |
| 5,446,666 | 8/1995 | Bauer | 364/434 |
| 5,552,983 | 9/1996 | Thornberg et al. | 364/424.027 |
| 5,581,250 | 12/1996 | Khviliviky | 340/961 |

OTHER PUBLICATIONS

Lyons, J.W., "Some Navigational Concepts for Remotely Piloted Vehicles", AGARD Conference Proceed, n 176, Med. Accur. Low Cost Navig. at Avion, Panel Tec. Meeting, 5–1–5–15, Sep. 1975.

"US GeoData Digital Line Graphs", U.S. Dept. of the Interior, U.S. Geolg. Surv. Earth Sci. Info Ctr. (Factsheet) Jun. 1993.

"US GeoData Digital Elevation Models", U.S. Dept. of the Interior. U.S. Geolg. Surv. Earth Sci. Info Ctr. (Factsheet) Jun. 1993.

Shifrin, Carole A., "Gripen Likely to Fly Again Soon," *Aviation Week & Space Technology*, Aug. 23, 1993, pp. 72–73.

*Primary Examiner*—Tan Q. Nguyen
*Attorney, Agent, or Firm*—Blakely, Sokoloff, Taylor and Zafman LLP

[57] ABSTRACT

A method and apparatus that allows a remote aircraft to be controlled by a remotely located pilot who is presented with a synthesized three-dimensional projected view representing the environment around the remote aircraft. According to one aspect of the invention, a remote aircraft transmits its three-dimensional position and orientation to a remote pilot station. The remote pilot station applies this information to a digital database containing a three dimensional description of the environment around the remote aircraft to present the remote pilot with a three dimensional projected view of this environment. The remote pilot reacts to this view and interacts with the pilot controls, whose signals are transmitted back to the remote aircraft. In addition, the system compensates for the communications delay between the remote aircraft and the remote pilot station by controlling the sensitivity of the pilot controls.

20 Claims, 7 Drawing Sheets

METHOD AND APPARATUS FOR REMOTELY PILOTING AN AIRCRAFT

BACKGROUND OF THE INVENTION—CROSS REFERENCES TO RELATED APPLICATIONS

"Pilot Aid Using a Synthetic Environment", Ser. No. 08/274,394 filed Jul. 11, 1994. "Digital Map Generator and Display System", Ser. No. 08/543,590, filed Oct. 16, 1995.

1. Field of Invention

This invention relates to the field of remotely piloted vehicles (RPVs) and unmanned aerial vehicles (UAVs).

2. Discussion of Prior Art

RPVs can be used for any number of purposes. For example, there is a large organization that promotes the use of remote controlled planes. Certain RPVs are controlled by viewing the plane with the naked eye and using a hand held controller to control its flight Other RPVs are controlled by a remote pilot using simple joysticks while watching the video produced by a camera in the remote aircraft. This camera is also used to produce the reconnaissance video. There are tradeoffs involving the resolution of the video, the rate at which the video is updated, and the bandwidth needed to transmit it. The wider the bandwidth the more difficult it is to secure the signal. The freedom to balance these tradeoffs is limited because this video is also used to pilot the aircraft and must therefore be updated frequently.

Certain UAVs are preprogrammed to follow a predetermined course and lack the flexibility to deal with unexpected situations.

The 1983 patent to Kanaly (U.S. Pat. No. 4,405,943) shows a control and communications system for a remotely piloted vehicle where an oculometer determines where the remote operator is looking and signals the remote vehicle to send the high resolution imagery corresponding to the area around where the remote operator is looking and low resolution imagery corresponding to the remote operator's peripheral vision. The objective is to minimize the bandwidth of the information transmitted to the remote operator.

SUMMARY

A method and apparatus is described that allows a remote aircraft to be controlled by a remotely located pilot who is presented with a synthesized three-dimensional projected view representing the environment around the remote aircraft According to one aspect of the invention, a system is used that includes an aircraft and a remote pilot station.

The aircraft uses a communications link to send its location, attitude, and other operating conditions to the remote pilot station. The remote pilot station receives the data and uses a database describing the terrain and manmade structures in the remote aircrafts environment to produce a 3D view of the remote aircraft environment and present it to the remote human pilot.

The remote pilot responds to the information and manipulates the remote flight controls, whose positions and forces are transmitted to the remote aircraft. Since the amount of data is small, it can be readily secured through encryption and spreadspectrum techniques.

Also, because the video reconnaissance cameras are no longer needed to remotely pilot the aircraft there is great flexibility in their use. To minimize bandwidth and reduce the possibility of being detected, the video data can be sent at a slow update rate. The data can also be stored on the remote aircraft for later transmission. Alternatively, low resolution pictures can be sent in real-time, while the corresponding high resolution pictures can be at a later time. The reconnaissance video can even be transmitted through a different communications link than the control data. There may also be more than one reconnaissance camera.

The delay in the control link must be minimized in order that the remote aircraft can be properly flown. The system can measure the link delay and make this information available to the pilot. This delay link measurement can also be used to modify the control software through which the remote pilot flies the remote aircraft. This is to prevent pilot-induced-oscillation.

The computers in the system allow for several modes of operation. For example, the remote aircraft can be instructed to fly to given coordinates without further input from the remote pilot. It also makes it possible to provide computer assistance to the remote pilot. In this mode, the remote flight control controls absolute pitch and roll angles instead pitch and roll rates which is the normal mode for aircraft In addition, adverse yaw can be automatically corrected so that the resulting control laws make the remote aircraft extremely easy to fly. Because this comes at the expense of being able to put the remote aircraft into unusual attitudes, for complete control of the remote aircraft a standard control mode is provided to give the remote pilot the same type of control that is used to fly a manned aircraft. Since the remote aircraft is unmanned, the remote pilot can subject the remote aircraft to high-G maneuvers that would not be safe for a pilot present in the aircraft.

To facilitate training, a simulated remote aircraft is provided that allows an instructor to set up the training mission and parameters. This is especially useful in giving remote pilots experience flying with different control link delays. In this simulated mode, the system can be further linked to a battlefield simulator such as SIMNET.

In the first embodiment, the remote pilot is provided with a standard video display. Additional display channels can be provided to give the remote pilot a greater field of view. There can even be a display channel to give a rearward facing view.

A second embodiment uses a head mounted display for the remote pilot instead of a standard display. This permits the remote station to be made more compact so that it can be used in a wider variety of installations. An example would be in a manned aircraft flying several hundred miles away.

BRIEF DESCRIPTION OF THE DRAWINGS

The invention may best be understood by referring to the following description and accompanying drawings which illustrate the invention. In the drawings.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

A method and apparatus is described that allows a remote aircraft to be controlled by a remotely located pilot who is presented with a synthesized three-dimensional projected view representing the environment around the remote aircraft. Since the video from a reconnaissance camera located on the remote aircraft is not used to pilot the remote aircraft, the amount of data transmitted between the remote aircraft and the remote pilot is small. This provides greater flexibility in how the remote aircraft is used and allows the transmitted data to be made more secure. The remote aircraft may be of any type, for example a remote control plane or helicopter as used by recreational enthusiast.

Figure 1:
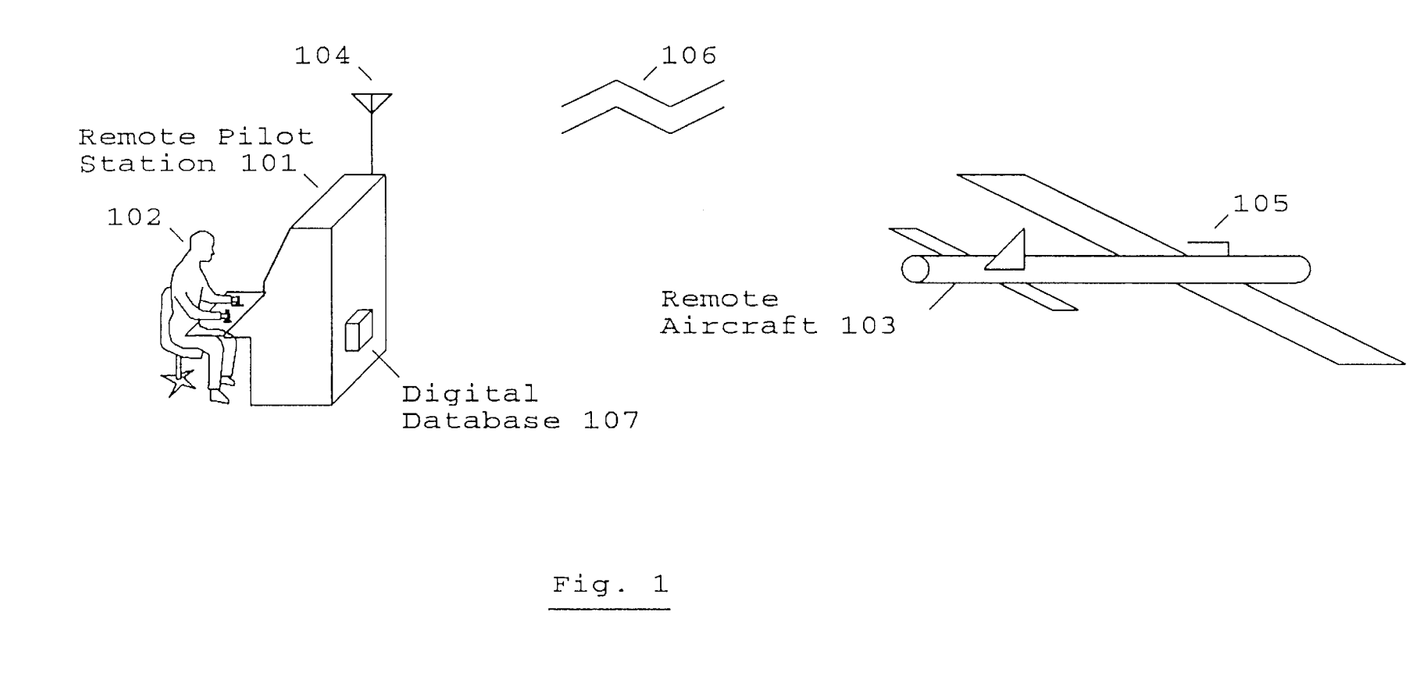
FIG. 1 is a general illustration showing a remote pilot at a remote pilot station operating a remote aircraft according to one embodiment of the invention.

FIG. 1 is a general illustration showing a remote pilot at a remote pilot station operating a remote aircraft according to one embodiment of the invention. FIG. 1 shows Remote Pilot 102 interacting with Remote Pilot Station 101 and controlling Remote Aircraft 103. Remote Pilot Station 101 and Remote Aircraft 103 respectively include an Antenna 104 and an Antenna 105 for communicating Information 106.

In one embodiment, Information 106 includes status information concerning the status of Remote Aircraft 103 and flight control information for controlling the flight of Remote Aircraft 103. The status information is generated by Remote Aircraft 103 and includes the three dimensional position and the orientation (also termed attitude, and comprising heading, roll, pitch) of Remote Aircraft 103. The status information may also include information concerning the flight surfaces, the engine, an additional altitude reading, etc. Remote Pilot Station 101 uses this status information to retrieve data from a Digital Database 107 which contains a three-dimensional description of terrain and manmade structures over which Remote Aircraft 103 is flying. Based on the three dimensional data retrieved from Digital Database 107, Remote Pilot Station 101 projects a synthesized three-dimensional projected view of the terrain and manmade structures in the vicinity of Remote Aircraft 103. Based on this view of the terrain and manmade structures, the Remote Pilot Station 101, on its own and/or in response to input from Remote Pilot 102, generates and transmits flight control information to Remote Aircraft 103 which adjusts its flight accordingly.

In one embodiment, the Remote Aircraft 103 is a remote controlled plane or helicopter used for recreational purposes. Since remote controlled planes and helicopters tend to be small in size, the circuitry in such remote aircraft to generate and receive Information 106 is minimized. In such systems, the Remote Pilot Station 101 may be implemented by including additional attachments to an existing portable computer. This allows the user to easily transport the remote aircraft and pilot station to an appropriate location for flight.

Figure 2:
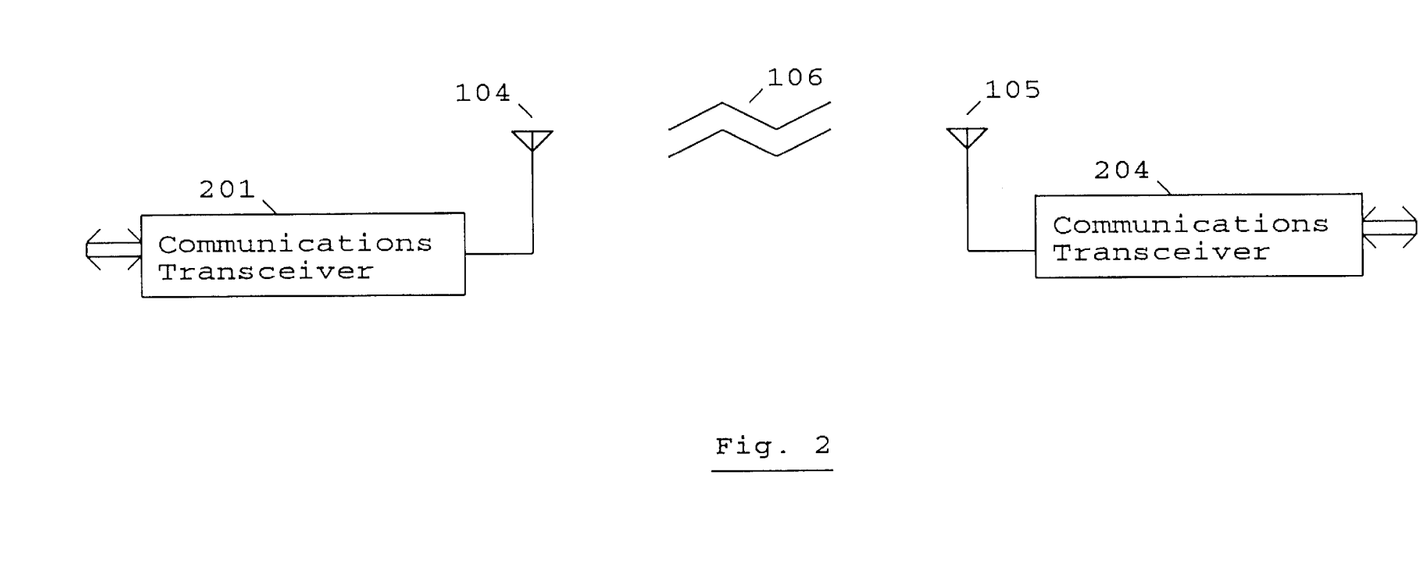
FIG. 2 is a block diagram showing the communications link between a remote pilot station and a remote aircraft according to one embodiment of the invention.

FIG. 2 is a block diagram showing a bi-directional communications link between a remote pilot station and a remote aircraft according to one embodiment of the invention. FIG. 2 shows Communications Transceiver 201 coupled to Antenna 104 of Remote Pilot Station 101, as well as Communications Transceiver 204 coupled to Antenna 105 of Remote Aircraft 103. In addition, FIG. 2 shows Information 106 being communicated between Antenna 104 and Antenna 105.

Figure 3:
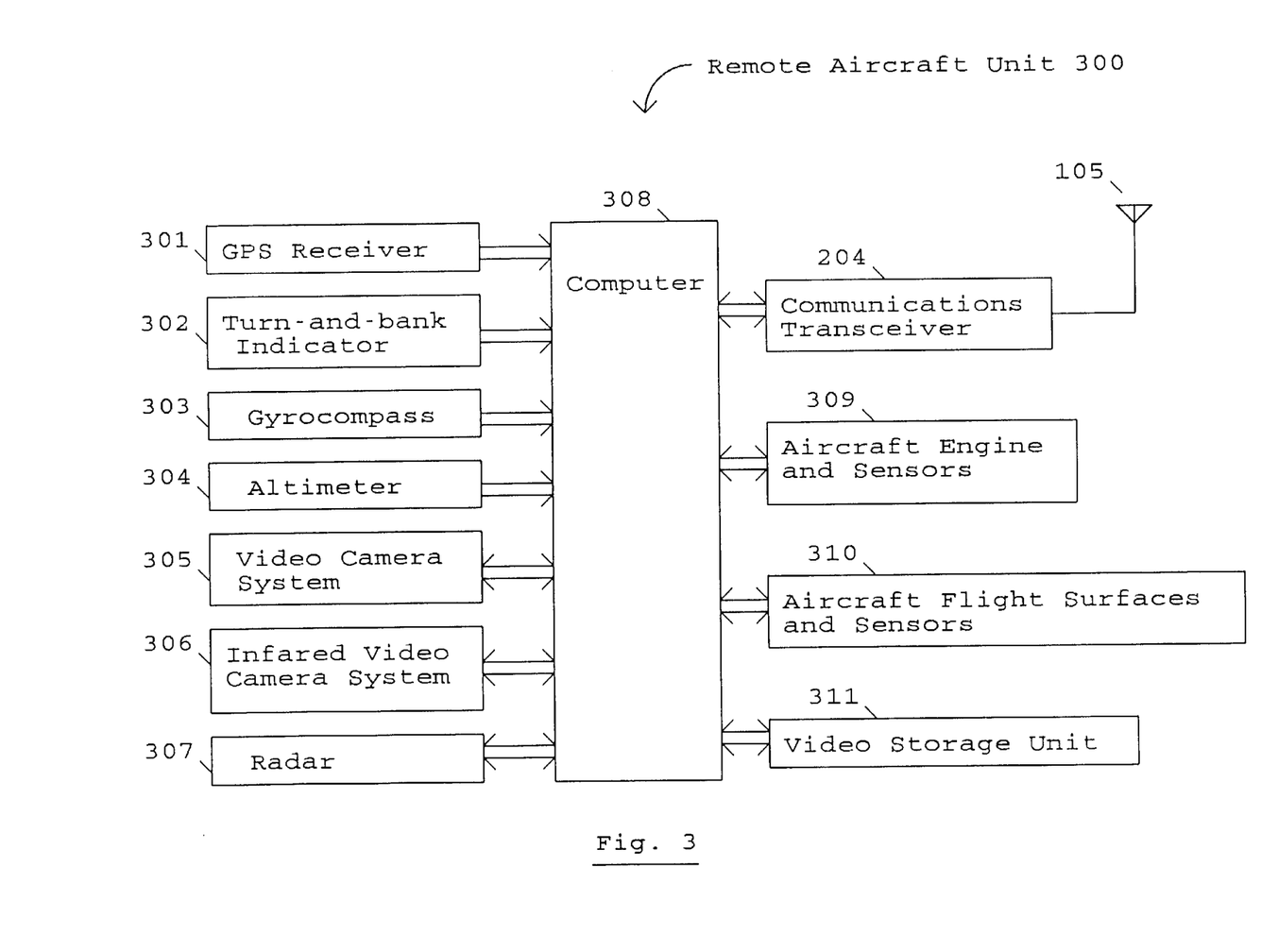
FIG. 3 is a block diagram of a remote aircraft according to one embodiment of the invention.

FIG. 3 is a block diagram of a remote aircraft unit used in the remote aircraft according to one embodiment of the invention. FIG. 3 shows Remote Aircraft Unit 300 including Computer 308 coupled to GPS Receiver 301, Turn-and-bank Indicator 302, Gyrocompass 303, Communications Transceiver 204, Aircraft Engine and Sensors 309, and Aircraft Flight Surfaces and Sensors 310. GPS Receiver 301 receives signals from the satellites that make up the global positioning system (GPS) and calculates the aircraft's position in three dimensions. Turn-and-bank Indicator 302 and Gyrocompass 303 provide the aircraft's orientation which comprises heading, roll, and pitch. This data is sent to Computer 308 for transformation into the previously described status information. Computer 308 transmits this status information to Communications Transceiver 204 which produces a radio signal and supplies it to Antenna 105.

The Aircraft Engine and Sensors 309 are coupled to control the aircraft's engine, while the Aircraft Flight Surfaces and Sensors 310 are coupled to control the aircraft's flight surfaces. The flight control information is received from the remote pilot station by Computer 308 through Antenna 105 and Communications Transceiver 204. This flight control information is processed by Computer 308 into the necessary signals for transmission to Aircraft Engine and Sensors 309 and Aircraft Flight Surfaces and Sensors 310 to control the aircraft's engine and flight surfaces, respectively. The operation of the aircraft's flight control surfaces will be later described with reference to FIG. 4.

In order to protect against ECM, the communications link between the Remote Pilot Station 101 and the Remote Aircraft 103 may be secured. While any number of different techniques may be used to secure this link, in one embodiment Computer 308 is implemented to encrypttdecrypt the data transmitted and Communications Transceiver 204 is implemented to use spread spectrum techniques.

Computer 308 may optionally be coupled to Altimeter 304, Video Camera System 305, Infrared Video Camera System 306, Radar 307, and/or Video Storage Unit 311. Altimeter 304 provides an output of the aircraft's altitude as a safety check in the event GPS Receiver 301 malfunctions. Thus, this additional altitude reading may also be transmitted to Remote Pilot Station 101 as part of the status information.

Video Camera System 305 is controlled by Computer 308 which determines where the camera is pointing as well as focusing and the zoom factor. The video produced by the camera is not used by the remote pilot for flying the remote aircraft, so there is more flexibility in using the video. As a result, any number of techniques can be used for receiving the images captured by Video Camera System 305. As examples:

1. High resolution, high update images may be sent back in real-time through the Communications Link, when the high bandwidth needed can be tolerated.
2. High resolution, low update images may be sent back in real-time through the Communications Link to reduce the bandwidth.
3. The video may be recorded in Video Storage Unit 311 for later transmission.
4. The video may be transmitted through a separate communications link.
5. There may be multiple video cameras.

Infrared Video Camera System 306 is similar to Video Camera System 305 and has the same operating modes.

Radar 307 in Remote Aircraft 103 may be passive or active. It may scan a particular pattern or it may track a selected object. Radar 307 may consist of several Radar units. The information from Radar 307 is processed by Computer 308 so that only the desired information is transmitted over the communication link to the Remote Pilot Station 101 for display.

Figure 4:
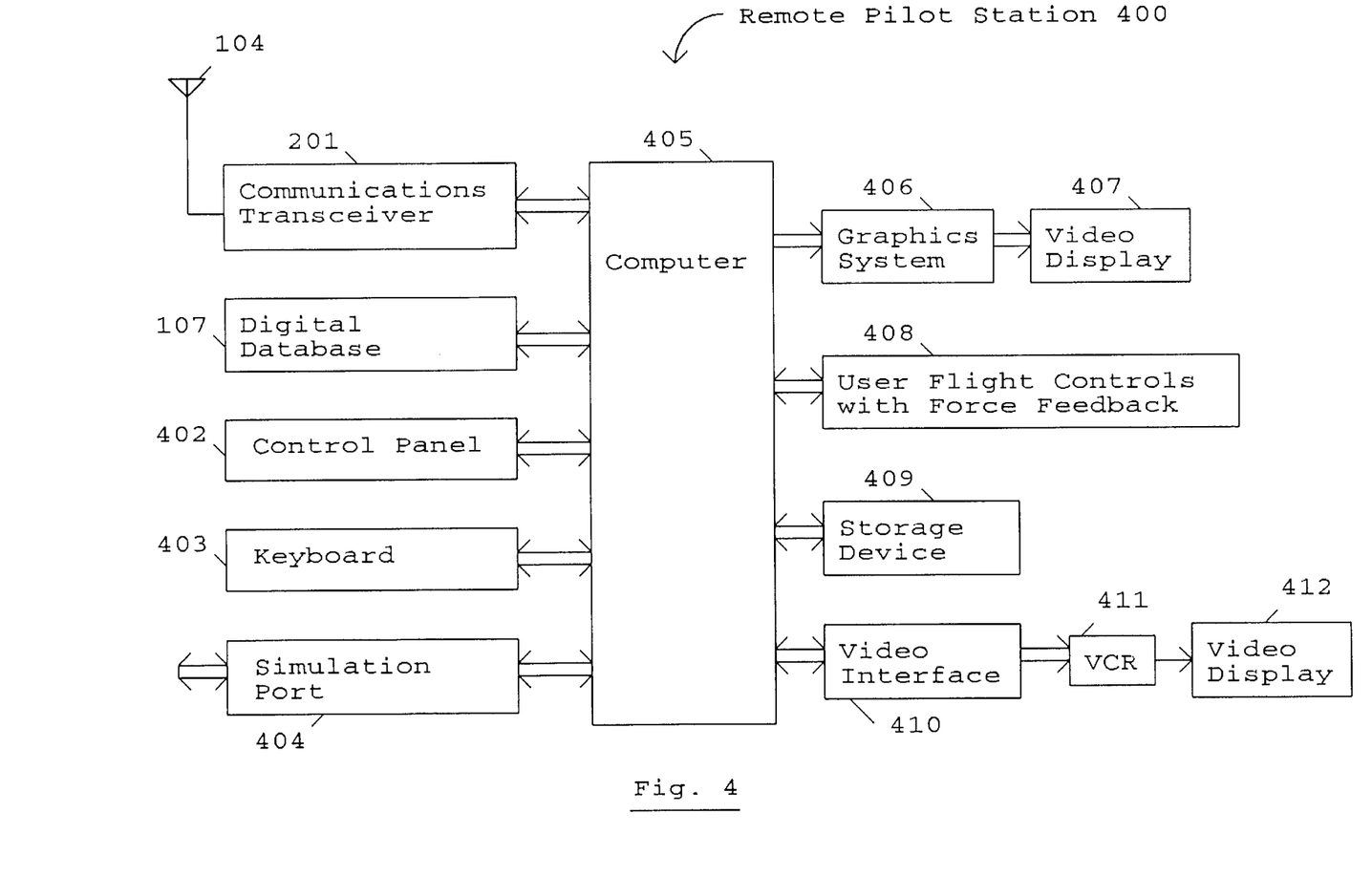
FIG. 4 is a block diagram of a remote pilot station according to one embodiment of the invention.

FIG. 4 is a block diagram of a remote pilot station according to one embodiment of the invention. FIG. 4 shows a Remote Pilot Station 400 including a Computer 405 coupled to Communications Transceiver 201, Digital Database 107, Graphics System 406, User Flight Controls with Force Feedback 408, and a Storage Device 409. The Storage Device 409 represents one or more mechanisms for storing data. For example, the Storage Device 409 may include read only memory TROM), random access memory (RAM), magnetic disk storage mediums, optical storage mediums, flash memory devices, and/or other machine-readable mediums. Of course, Digital Database 107 may be stored in one or more machine-readable mediums and/or in Storage Device 409.

As previously described, Antenna 104 receives the radio signals transmitted by Remote Aircraft 103 representing the status information of Remote Aircraft 103. These radio signals are transformed by Communications Transceiver 201 and sent to Computer 405. Communications Transceiver 201 is set to the same mode as Communications Transceiver 204, so that if, for example, spread spectrum techniques are used, the signal will be transparently received. Computer 405 recovers the data (de-encrypting, if required) so that the data communications from Computer 308 in the Remote Aircraft to Computer 405 in the Remote Pilot Station is transparent. Thus, the bi-directional communications link comprises the combination of Communications Transceiver 201, Antenna 104, Antenna 105, and Communications Transceiver 204.

As previously described, the status information received by Computer 405 includes the three dimensional position and the orientation of Remote Aircraft 103. The status information may also include information concerning the flight surfaces, flight sensors, the engine, an additional altitude reading, etc. Computer 405 uses this status information to retrieve data from Digital Database 107 which contains a three-dimensional description of terrain and manmade structures over which Remote Aircraft 103 is flying. The composition and creation of the Digital Database 107 is further described later. Based on the three dimensional data retrieved from Digital Database 107, Computer 405 performs the mathematical operations to transform and project the three dimensional data to generate video data representing a synthesized three-dimensional projected view of the terrain (and, if desired, manmade structures) in the vicinity or environment of Remote Aircraft 103. This video data is transmitted to Graphics System 406, which displays the synthesized three-dimensional projected view on Video Display 407.

Since the image is generated from the digital database, virtually any image of the environment of the Remote Aircraft 103 can be generated. As examples, the pilot may select the environment to be: 1) a simulated image of what would be seen out of the cockpit of a manned aircraft on a similar flight path; 3) a simulated image of what would be seen when looking in any direction (e.g., backwards, out a side window, etc.); 3) a simulated image of what would be seen if a camera were tailing the remotely piloted aircraft; etc. In addition, the simulated image may be set to any magnification. Thus, the phrase environment of Remote Aircraft 103 is intended to include any image generated with reference to the remote aircraft's position.

The User Flight controls with Force Feedback 408 are used by the remote pilot to input flight path information. The User Flight Controls may be of any number of different types, some of which are further described later herein. The status information received by Computer 405 also includes information received from Aircraft Flight Surfaces and Sensors 310. This information is used to actuate force feedback circuitry in User Flight Controls With Force Feedback 408. Remote Pilot 102 observes the synthesized three-dimensional environment displayed on Video Display 407, feels the forces on User Flight Controls With Force Feedback 408 and moves the controls accordingly. This flight control information is sent through the communications link, to Computer 308, and is used to control the aircraft flight surfaces in Aircraft Flight Surfaces and Sensors 310. Remote Pilot 102 also receives data from Aircraft Engine and Sensors 309 through the communications link and is able to send data back to control the engine.

Flight Control

To illustrate the operation of the remote aircraft, a fixed-wing airplane will be described as an example. However, the basic principles apply to other types of aircraft as well. The basic control surfaces of an airplane consist of the ailerons, the horizontal elevators, and the rudder. The ailerons are moved differentially (one up, one down) to rotate the airplane around its roll axis; the horizontal elevators cause the airplane to rotate around its pitch axis; and the rudder causes the airplane to rotate around its yaw axis.

When the ailerons are used to modify the lift characteristics of the wings, one wing creates more lift while the other wing creates less lift. This also changes the drag characteristics of the wings and results in a yaw force that is opposite to the yaw force that results from the tail section causing the airplane to weather-cock into the relative wind. It is this yaw force caused by the airplane weather-cocking into the relative wind that causes a banked airplane to turn. The opposite yaw force produced by using the ailerons is called adverse yaw; the rudder control is used to counteract this force to produce a coordinated turn.

The simplest type of flight control consists of a joystick and a set of rudder pedals. The controls are directly connected to the flight control surfaces. With a joystick, moving the stick left and right moves the ailerons, while moving the stick forward and backward moves the horizontal elevators. The rudder is controlled by two foot pedals, one for each foot, that are mounted on a common shaft and hinged in the middle like a seesaw. Pressing one foot pedal forward causes the other foot pedal to move backward and causes the rudder to also move in one direction. Pressing the other foot pedal causes it to move forward and the opposite pedal to move backward and causes the rudder to move in the opposite direction.

An alternative to the joystick is the control yoke which consists of a wheel attached to a shaft that moves in and out of the control housing. Turning the wheel clockwise or counterclockwise moves the ailerons; moving the wheel shaft in and out moves the horizontal elevators. The rudder pedals as the same as those used with a joystick.

In order to aid in a description of remote aircraft operation, it is thought worthwhile to first describe the operation of non-remotely piloted vehicles. Non-remotely piloted vehicles can be operated in one of two ways (also termed as flight control modes); direct control or computer control (also termed as computer mediated).

Direct Control Non-Remotely Piloted Vehicles

When the flight controls are connected directly to the control surfaces the result is a second order system. Using the joystick as an example, moving the joystick left or right establishes a roll rate. The airplane continues to roll until the joystick is returned to the center position, after which the airplane remains in the bank angle thus established. The foot pedals are used to counteract the adverse yaw as previously described. Moving the joystick forward or backward establishes a pitch rate. The airplane continues to pitch until the joystick is returned to the center position, after which the airplane remains in the pitch angle thus established. Both the roll rate and the pitch rate are subject to the limits of the airplane's design.

Since the joystick is directly connected to the control surfaces, the aerodynamic forces on the control surfaces are transmitted back to the pilot, giving him or her valuable feedback on how the airplane is flying.

The successful operation of the second order system with the pilot in the loop depends on several factors such as the area and placement of the control surfaces, how much the control surfaces move in response to the movement of the pilot controls, and how long the airplane takes to respond to changes of the control surfaces. The total system characteristics also depend on the reaction time of the pilot. If the resulting system is poorly designed it may be unstable, which means it may not be possible for a human pilot to fly it safely. An example of an unstable system is where the pilot desires to perform a gentle roll to the right and so moves the joystick to the right, the airplane's roll rate is faster than the pilot desires so he/she attempts to compensate by moving the joystick to the left, the airplane rolls left at a rate that is faster than the pilot desires so he/she moves the joystick to the right, and so on, with the pilot constantly overcorrecting and with the aircraft's rolling motions constantly getting larger and larger until the aircraft gets into a condition from which it may not be possible to recover, (e.g., spinning into the ground). The type of loss of control described is usually referred to as 'pilot induced oscillation' and although it may be caused by an inexperienced or inattentive pilot, it is more often caused by poor airplane design. Therefore, new airplane designs are extensively tested to make sure they can be safely flown. Examples of airplanes that use direct control of the control surfaces (Direct Control Second Order Systems) are the Cessna 150 and the Piper Cub.

Computer Mediated Non-Remotely Piloted Vehicles

Computer mediated control systems use a computer between the pilot controls and the control surfaces. The pilot controls are read by the computer, the data are modified in a particular way, and the computer sends control signals to the control surfaces. The computer may also sense the forces on the control surface and use it to control force feedback to the pilot controls. This type of computer mediated control may be used to fly an airplane that would otherwise be unstable, such as the F16 or the F117. Aircraft such as the F16 and F117 are also second order systems because the position of the pilot's joystick represents rate of rotation.

There are risks inherent in a computer mediated system. Although the program can be simulated extensively before using it in an actual airplane, the computer program may be quite large and therefore difficult to simulate under all possible conditions. An example of this is the Swedish JAS 39 Gripen Fighter. Despite extensive simulation of the flight control system, during a test flight a Gripen crashed due to " . . . the flight control system's high amplification of stick commands combined with the pilot's" large, rapid stick movements"." The pilot had entered a low-speed high-banked turn at a 280 meter altitude with lit afterburners and was leaving the turn when his actions led to 'pilot-induced oscillation'. (Aviation Week & Space Technology, Aug. 23, 1993, pages 72–73).

Having described techniques for operating non-remotely piloted vehicles, the Fight Control Modes for RPVs will be described.

Second Order RPV Flight Control Mode

A second order control system for an RPV is inherently computer mediated because the remote pilot must interact through two computers: the computer in the remote aircraft and the computer in the remote pilot station.

Flying an RPV is further complicated because there are additional time delays in the loop. The computer in the remote aircraft must first determine the aircraft's position and orientation. The additional processing for transmitting a secure signal by encryption and/or spread spectrum techniques may create additional delays. Transmission delay of signals between the remote aircraft and remote pilot station is negligible for a direct path. However, if the signals are relayed through other facilities the delay time may be appreciable, especially if an orbiting satellite is used. There are additional delays in the remote pilot station as the remote aircraft's position and orientation are used to transform the data from the digital database to present the pilot with the synthesized 3D projected view from the remote aircraft. In one embodiment, the RPV system measures the various delays and modifies the control laws used by the computer in the remote pilot aircraft and in the feedback provided by the computer in the remote pilot station to the remote pilot. For example, the computer may adjust the sensitivity of the User Flight Controls 408 according to the delay (e.g., as the delay increases, the computer will decrease the sensitivity of the flight controls). The system also displays the measured delay to the remote pilot.

First Order RPV Flight Control Mode

The stability of the flight control system, and thus the flyability of an RPV, can be improved considerably by using a first order system. In one embodiment of such a first order system the position of the remote pilot's joystick represents an angle relative to the horizon, instead of representing a rate of rotation as in a second order system. The position of the joystick is transmitted to the computer in the remote aircraft which moves the control surfaces as required to place the remote aircraft in the requested orientation. The control system in the remote aircraft is still a second order system but the delays in the communications link and the remote pilot station are no longer a part of the system's loop.

When a joystick is centered, the remote aircraft will fly straight and level. When the joystick is to the right of center the remote aircraft will be in a right banked turn. When the joystick is to the left of center the remote aircraft will be in a left banked turn. When the joystick is backward from center the remote aircraft will be in a pitch up orientation. When the joystick is forward of center the remote aircraft will be in a pitch down orientation.

The amount of bank and pitch permitted depends on the design of the remote aircraft. A high performance remote aircraft will be capable of a greater amount of pitch and bank than will a low performance remote aircraft.

Referring again to FIG. 4, Computer 405 may optionally be coupled to Control Panel 402, Keyboard 403, Simulation Port 404, Video Interface 410, VCR 411, and/or Video Display 412. In one embodiment, Control Panel 402 contains specialized lights, displays, and switches to allow a quicker response to situations than can be provided by Keyboard 403. Control Panel 402 can be arranged to approximate the look and feel of an actual aircraft cockpit. Keyboard 403 allows the remote pilot to select various operating modes. For training purposes, Simulation Port 404 allows the remote pilot station to be connected to a remote aircraft simulator instead of an actual remote aircraft. The remote aircraft simulator will be further described with reference to FIG. 6. Storage Device 409 allows the flight data to be recorded. During playback this previously recorded data is substituted for real-time data from the remote aircraft to replay the mission for analysis. Any video received from any reconnaissance cameras on the Remote Aircraft 103 is converted by Video Interface 410 so that it can be recorded on VCR 411 and displayed on Video Display 412. VCR 411 can also operate in straight-through mode so that the reconnaissance video can be viewed in real time.

Figure 5:
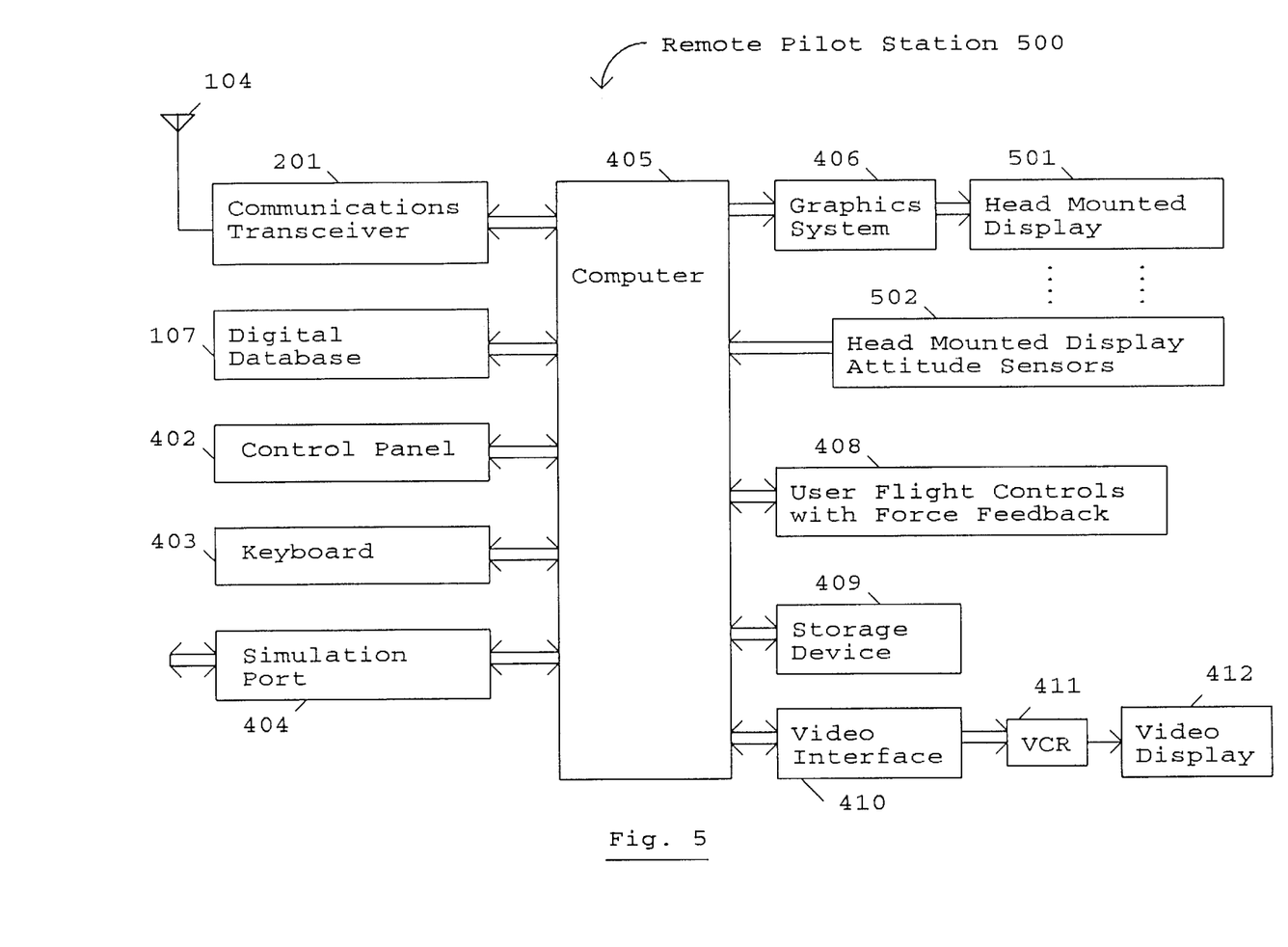
FIG. 5 is a block diagram of a remote pilot station according to another embodiment of the invention.

FIG. 5 is a block diagram of a remote pilot station according to another embodiment of the invention. FIG. 5 shows Remote Pilot Station 500. Remote Pilot Station 500 is similar to Remote Pilot Station 400 of FIG. 4, except Video Display 407 is replaced by Head Mounted Display 501. In addition, Head Mounted Display Attitude Sensors 502 are coupled to Computer 405. Head Mounted Display Attitude Sensors 502 measure the attitude of Head Mounted Display 501. This information is used by Computer 405 to produce an additional three dimensional transformation of the data from Digital Database 107 to account for the attitude of the remote pilots Head Mounted Display 501. This does not require any additional data from the remote aircraft. Of course, alternative embodiments could include both a video display and a head mounted display.

Figure 6:
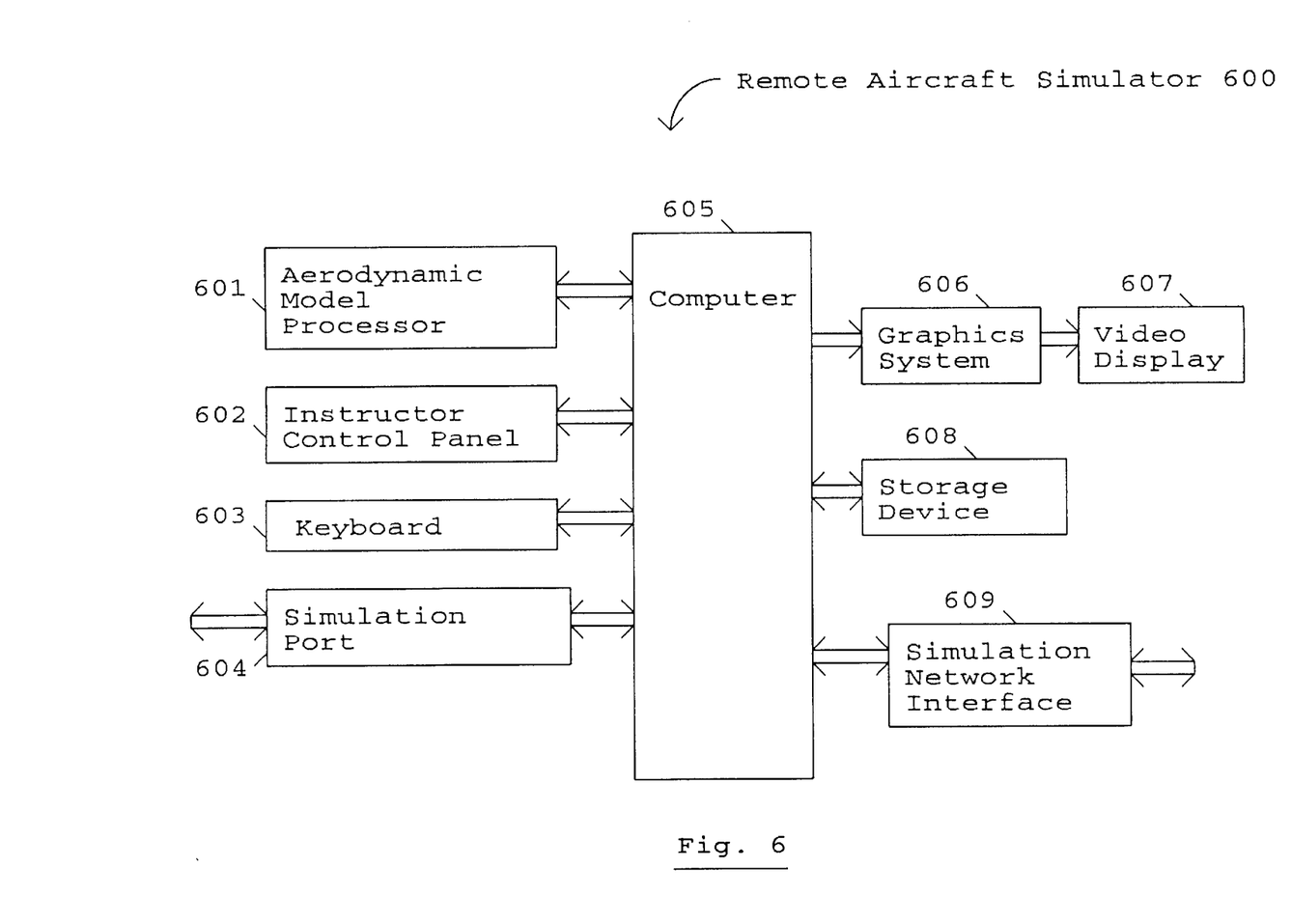
FIG. 6 is a block diagram of a remote aircraft simulator used for training remote pilots according to one embodiment of the invention.

FIG. 6 is a block diagram of a simulated remote aircraft used for training remote pilots according to one embodiment of the invention. FIG. 6 shows Remote Aircraft Simulator 600 including Computer 605 coupled to Aerodynamic Model Processor 601, Instructor Control Panel 602, Keyboard 603, Simulation Port 604, Graphics System 606, Storage Device 608, and Simulation Network Interface 609. Remote Aircraft Simulator 600 communicates with Remote Pilot Station 400 or 500 through Simulation Port 604. Aerodynamic Model Processor 601 executes a mathematical model that simulates the behavior of a remote aircraft. An instructor uses Instructor Control Panel 602 and Keyboard 603 to select various training scenarios. Graphics System 606 and Video Display 607 are used to observe the operation of the system. Storage Device 608 is used to record the training session for later evaluation of the session. In addition to proficiency training, the Remote Aircraft Simulator can also be used to practice a proposed mission. The data communicated to the remote pilot station can include training and evaluation data for processing and/or display. This training and evaluation data can include any relevant information, such as flight path accuracy, etc.

Simulation Network Interface 609 permits participation in a battlefield simulation system such as SIMNET, mixing aircraft, tanks, and ground troops for training in the coordination of mixed forces. Thus, the system is designed to allow for the communication of this battlefield simulation information between the remote aircraft simulator and the remote pilot station. This allows the remote pilot station to display one or more other simulated entities (e.g., tanks, ground troops, other aircraft, etc.) described by the battlefield simulation information.

The Database

The Digital Database 107 can be comprised of any type of data from which a three dimensional image can be generated. For example, the U.S. Geological Survey (USGS) makes available various databases, two of which are of particular interest The first is the Digital Elevation Model data which consist of an array of regularly spaced terrain elevations.

The other USGS database is the Digital Line Graph data which includes: political and administrative boundaries; hydrography consisting of all flowing water, standing water, and wetlands; major transportation systems consisting of roads and trails, railroads, pipelines, transmission lines, and airports; and significant manmade structures. The Digital Line Graph data is two-dimensional. In the present invention features such as water, roads, railroads, and pipelines are represented as polygons with elevations determined from the Digital Elevation Model data. Transmission lines and significant manmade structures are defined as three-dimensional objects made of polygons and are placed according to the elevations determined from the Digital Elevation Model data. The different types of objects are tagged so that the remote pilot can select them to be highlighted by category or by specific object.

Data from additional digital databases can also be incorporated. An example of such a database is from Jeppesen Sanderson whose NavData Services division provides aeronautical charts and makes this information available in digital form.

Figure 7:
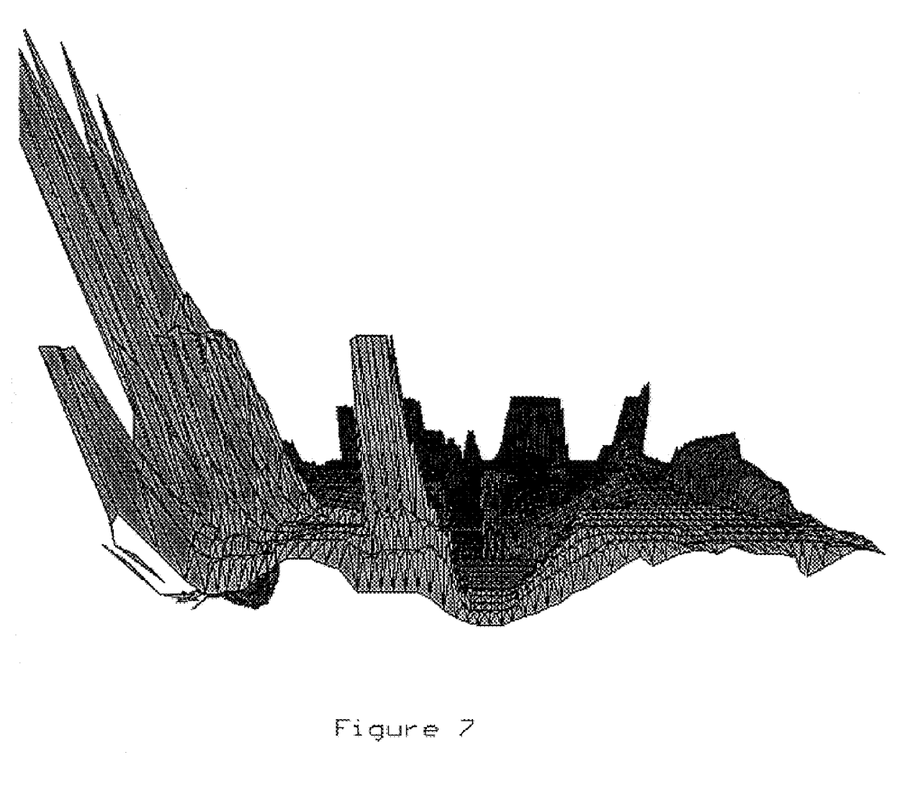
FIG. 7 is an example of a three dimensional projected image presented to a remote pilot by a remote pilot station according to one embodiment of the invention.

The procedure for generating the synthesized three-dimensional view from the Digital Database may use any number of techniques, including those disclosed in the 1987 patent to Beckwith et al. (U.S. Pat. No. 4,660,157 REAL TIME VIDEO PERSPECTIVE DIGITAL MAP DISPLAY METHOD), and the 1993 patent to Dawson et al. (U.S. Pat. No. 5,179,638 METHOD AND APPARATUS FOR GENERATING A TEXTURE MAPPED PERSPECTIVE VIEW). One disadvantage of generating the synthesized three-dimensional view from these elevation databases in real time is the amount of storage space they require. To avoid this large amount of data storage, one embodiment of Digital Database 107 is composed of terrain data that represents the real terrain using polygons. This database may be generated using any number of techniques. For example, this database may be generated by transforming one or more elevation databases into a polygon database using the technique taught in "Pilot Aid Using a Synthetic Environment", Ser. No. 08/274,394 filed Jul. 11, 1994. Another method for transforming one or more elevation databases into a polygon database is taught in "Digital Map Generator and Display System", Ser. No. 08/543,590, filed Oct. 16, 1995. An example of a three dimensional projected image created from this database is shown in FIG. 7.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A system comprising:
   a remotely piloted aircraft including,
   a position determining system to locate said remotely piloted aircraft's position in three dimensions; and
   an orientation determining system for determining said remotely piloted aircraft's orientation in three dimensional space;
   a communications system for communicating flight data between a computer and said remotely piloted aircraft, said flight data including said remotely piloted aircraft's position and orientation, said flight data also including flight control information for controlling said remotely piloted aircraft;

a digital database comprising terrain data;

said computer to access said terrain data according to said remotely piloted aircraft's position and to transform said terrain data to provide three dimensional projected image data according to said remotely piloted aircraft's orientation;

a display for displaying said three dimensional projected image data; and a set of one or more remote flight controls coupled to said computer for inputting said flight control information, wherein said computer is also for determining a delay time for communicating said flight data between said computer and said remotely piloted aircraft, and wherein said computer adjusts the sensitivity of said set of one or more remote flight controls based on said delay time.

2. The system of claim 1, wherein:

said remotely piloted aircraft includes a device for capturing image data; and said system operates in at least a first mode in which said image data is not transmitted from said remotely piloted aircraft to said computer at a sufficient data rate to allow for real time piloting of the remotely piloted aircraft.

3. The system of claim 1, wherein the flight data communicated between said remotely piloted aircraft and said computer is secured.

4. The system of claim 1, wherein said remotely piloted aircraft further comprises a set of one or more video cameras.

5. The system of claim 4, wherein said communications system is also for communicating video data representing images captured by said set of one or more video cameras, said video data for displaying said images.

6. The system of claim 5, wherein said video data is transmitted on a different communication link than said flight data.

7. The system of claim 4, wherein at least one camera in said set of one or more video cameras is an infrared camera.

8. The system of claim 1, wherein said display is a head mounted display.

9. The system of claim 1, wherein said set of one or more remote flight controls is responsive to manual manipulations.

10. The system of claim 1, wherein said set of one or more remote flight controls allows for inputting absolute pitch and roll angles instead of pitch and roll rates.

11. The system of claim 1, wherein said computer is also used for correcting adverse yaw without requiring input from said set of one or more remote flight controls.

12. The system of claim 1, wherein:

said remotely piloted aircraft includes a device for capturing image data; and said system operates in at least a first mode in which said image data is not transmitted from said remotely piloted craft to said computer but stored in said remotely piloted aircraft.

13. A station for flying a remotely piloted aircraft that is real or simulated comprising:

a database comprising terrain data;

a set of remote flight controls for inputting flight control information;

a computer having a communications unit configured to receive status information identifying said remotely piloted aircraft's position and orientation in three dimensional space, said computer configured to access said terrain data according to said status information and configured to transform said terrain data to provide three dimensional projected image data representing said remotely piloted aircraft's environment, said computer coupled to said set of remote flight controls and said communications unit for transmitting said flight control information to control said remotely piloted aircraft, said computer also to determine a delay time for communicating said flight control information between said computer and said remotely piloted aircraft, and said computer to adjust the sensitivity of said set of remote flight controls based on said delay time; and a display configured to display said three dimensional projected image data.

14. The station of claim 13, wherein said communications unit is also configured to receive video data representing images captured by a set of video cameras on said remotely piloted aircraft, said video data for displaying said images.

15. The station of claim 14, wherein said video data is transmitted on a different communication link that said flight control information and said status information.

16. The station of claim 13, wherein said display is a head mounted display.

17. The station of claim 13, wherein said set of remote flight controls is responsive to manual manipulations.

18. The station of claim 13, wherein said set of remote flight controls are configured to allow inputting absolute pitch and roll angles instead of pitch and roll rates.

19. The station of claim 13, wherein said computer is also configured to correct adverse yaw without requiring input from said set of remote flight controls.

20. The station of claim 13, wherein said communications unit includes at least one of a communications transceiver and a simulation port.

\* \* \* \* \*